(12) United States Patent
Bernhard et al.

(10) Patent No.: US 7,831,734 B2
(45) Date of Patent: Nov. 9, 2010

(54) METHOD AND SYSTEM FOR REMOTE CONFIGURATION OF NETWORK DEVICES

(75) Inventors: Sven Bernhard, Waldmohr (DE); Thorsten Stephan, Heidelberg (DE); Claudius Fischer, Schwetzingen (DE); Janusz Smilek, St. Wendel (DE); Markus Schmidt-Karaca, Heidelberg (DE)

(73) Assignee: SAP AG, Walldorf (DE)

( * ) Notice: Subject to any disclaimer, the term of this patent is extended or adjusted under 35 U.S.C. 154(b) by 1264 days.

(21) Appl. No.: 10/720,073

(22) Filed: Nov. 25, 2003

(65) Prior Publication Data

US 2004/0199611 A1   Oct. 7, 2004

Related U.S. Application Data

(60) Provisional application No. 60/429,474, filed on Nov. 25, 2002, provisional application No. 60/429,470, filed on Nov. 25, 2002, provisional application No. 60/429,789, filed on Nov. 25, 2002, provisional application No. 60/429,859, filed on Nov. 26, 2002, provisional application No. 60/429,563, filed on Nov. 26, 2002, provisional application No. 60/429,690, filed on Nov. 26, 2002.

(51) Int. Cl.
G06F 15/16 (2006.01)
G06F 15/177 (2006.01)
(52) U.S. Cl. .................. 709/248; 709/220; 709/223
(58) Field of Classification Search .............. 709/248, 709/220, 223
See application file for complete search history.

(56) References Cited

U.S. PATENT DOCUMENTS

| | | | |
|---|---|---|---|
| 6,272,545 B1 * | 8/2001 | Flanagin et al. | 709/228 |
| 6,460,051 B1 * | 10/2002 | LaRue et al. | 1/1 |
| 6,477,543 B1 * | 11/2002 | Huang et al. | 707/200 |
| 6,799,198 B1 * | 9/2004 | Huboi et al. | 709/203 |
| 6,920,486 B2 * | 7/2005 | Kiiskinen | 709/214 |
| 7,007,041 B2 * | 2/2006 | Multer et al. | 707/201 |
| 7,054,924 B1 * | 5/2006 | Harvey et al. | 709/220 |
| 7,191,218 B1 * | 3/2007 | Innes | 709/206 |
| 2001/0008019 A1 * | 7/2001 | Vert et al. | 714/1 |
| 2001/0054072 A1 * | 12/2001 | Discolo et al. | 709/206 |
| 2002/0004824 A1 * | 1/2002 | Cuan et al. | 709/208 |
| 2002/0010807 A1 * | 1/2002 | Multer et al. | 709/328 |
| 2002/0029227 A1 * | 3/2002 | Multer et al. | 707/203 |
| 2002/0040369 A1 * | 4/2002 | Multer et al. | 707/201 |
| 2002/0085579 A1 * | 7/2002 | Sullivan et al. | 370/428 |
| 2002/0095527 A1 * | 7/2002 | Shizuka et al. | 709/327 |
| 2003/0065947 A1 * | 4/2003 | Song et al. | 713/201 |
| 2003/0084104 A1 * | 5/2003 | Salem et al. | 709/205 |
| 2003/0084439 A1 * | 5/2003 | Perkins et al. | 717/177 |
| 2003/0101246 A1 * | 5/2003 | Lahti | 709/221 |
| 2003/0101329 A1 * | 5/2003 | Lahti et al. | 712/1 |
| 2003/0182408 A1 * | 9/2003 | Hu | 709/223 |

(Continued)

OTHER PUBLICATIONS

Sudharshana et al. OTA Mobile Device Software Development. Nov. 11, 2002. http://www.sdrforum.org/pages/sdr02/SW1-03%20Bok.*

*Primary Examiner*—Thu Nguyen
*Assistant Examiner*—Hieu Hoang
(74) *Attorney, Agent, or Firm*—Kenyon & Kenyon LLP (57) ABSTRACT

The present invention provides a method and system for remote configuration of heterogeneous network devices from a centralized location.

20 Claims, 6 Drawing Sheets

U.S. PATENT DOCUMENTS

| | | | |
|---|---|---|---|
| 2003/0217181 A1* | 11/2003 | Kiiskinen | 709/248 |
| 2003/0225797 A1* | 12/2003 | Shields et al. | 707/202 |
| 2004/0064591 A1* | 4/2004 | Noble | 709/250 |
| 2004/0205263 A1* | 10/2004 | Sivaraman et al. | 710/21 |
| 2004/0215669 A1* | 10/2004 | Mettala et al. | 707/201 |
| 2006/0236363 A1* | 10/2006 | Heard et al. | 726/1 |
| 2007/0016695 A1* | 1/2007 | Rabbers et al. | 709/248 |
| 2007/0177571 A1* | 8/2007 | Caulfield et al. | 370/350 |
| 2007/0180075 A1* | 8/2007 | Chasman et al. | 709/223 |
| 2007/0226155 A1* | 9/2007 | Yu et al. | 705/400 |

* cited by examiner

METHOD AND SYSTEM FOR REMOTE CONFIGURATION OF NETWORK DEVICES

CROSS REFERENCE TO RELATED APPLICATIONS

This application claims priority to U.S. Provisional Application No. 60/429,474, filed Nov. 25, 2002, U.S. Provisional Application No. 60/429,470, filed Nov. 25, 2002, U.S. Provisional Application No. 60/429,789, filed Nov. 25, 2002, U.S. Provisional Application No. 60/429,859, filed Nov. 26, 2002, U.S. Provisional Application No. 60/429,563, filed Nov. 26, 2002, and U.S. Provisional Application No. 60/429,690, filed Nov. 26, 2002.

FIELD OF THE INVENTION

The present invention relates to the fields of information, computer software systems and computer networks. In particular, the present invention provides a method and system for configuring network devices in any arbitrary network topology.

BACKGROUND INFORMATION

The complexities of modern business practices have required an evolution in computing networks and associated software systems. For example, distributed software systems in which a software application solution is achieved via a collaborative effort between multiple computing entities within the network have become commonplace.

Figure 1A:
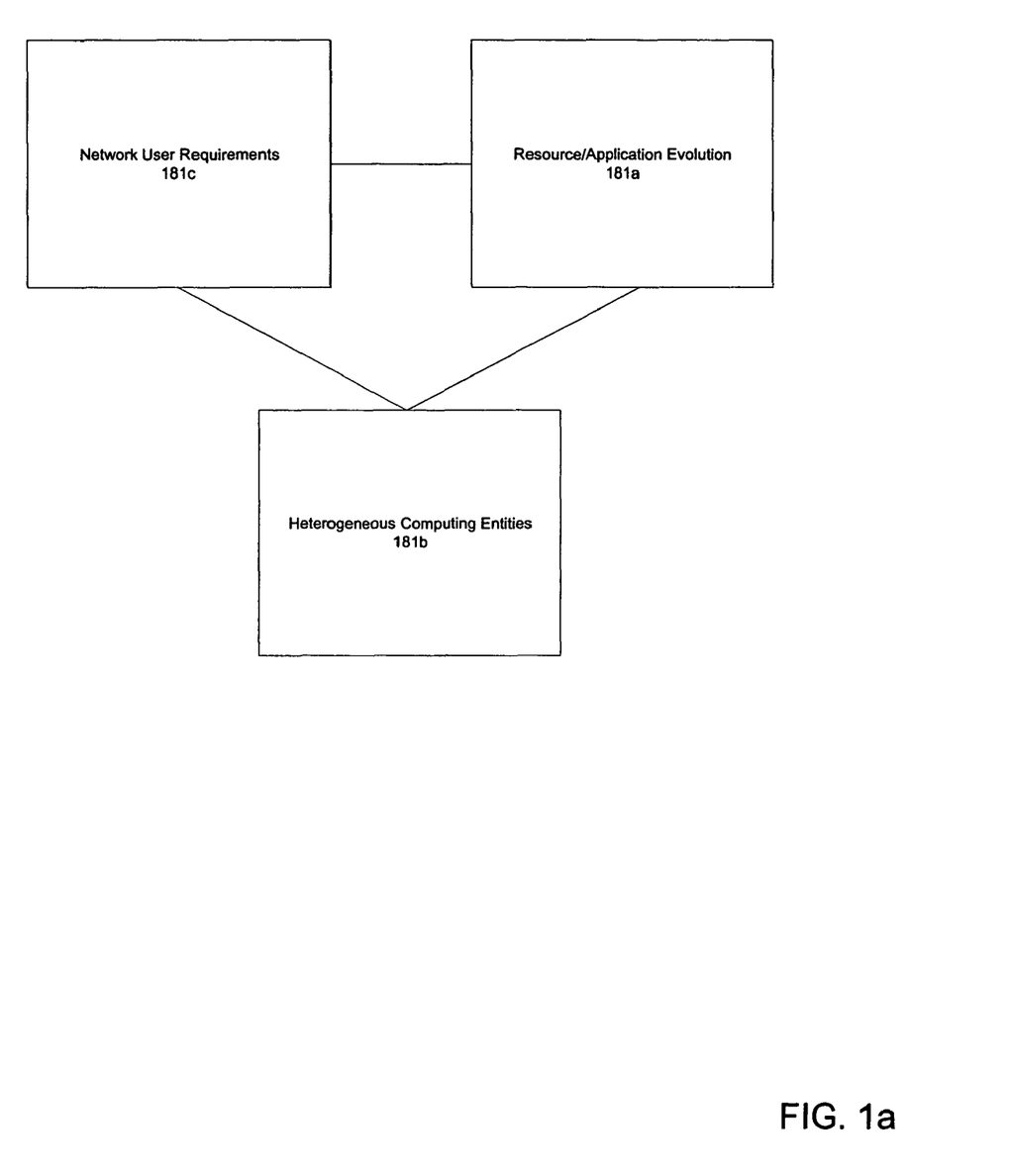
FIG. 1a depicts various deployment and configuration challenges in a network environment.

As depicted in FIG. 1a, distributed software systems present particular administrative, configuration and deployment challenges. For example, a particular application solution may involve the roles of many computing entities having heterogeneous capabilities 181b. In particular, the complexity of modern computer networks is complicated by the heterogeneous nature of devices connecting to the network. For example, modern networks must allow simultaneous connection of desktop computers, laptop computers, PDAs ("Personal Digital Assistants") etc. Further, each of these device classes may utilize different operating systems, and may interface with peripheral devices in any arbitrary manner. Each computing entity participating in an application solution may require a combination of many resources including executable program code, data, etc. In complex networks, thousands of distributed applications may coexist.

Second, the resources and applications comprising the distributed applications may also be evolving in time as software developers generate updates and patches (181a). Thus, deployment of resources within a distributed computing environment is complicated due to concurrent software development.

Third, network users themselves also impose a diverse set of requirements 181c. For example, some users may require particular configuration of their devices such as particular power saving schemes, enablement of disablement of various menu items or options, particular options for installed applications, etc.

Managing such a diverse set of devices among an equally diverse user-base becomes logistically complex. The complexity of the problem is further complicated by the simultaneous development efforts, through which updates, patches, are evolving in real time.

SUMMARY OF THE INVENTION

The present invention provides a method and system for remote configuration of heterogeneous network devices from a centralized location. According to the present invention, each network device participates in a particular application solution, which comprises a distributed network application. For each distributed application solution, an application solution descriptor ("ASD") maintains a representation of all resources associated with computing entities participating in an application solution. A network node includes a configuration module, which performs configuration of computing entities participating in an application solution.

The network node stores a database of device specific application resources that may be deployed to particular devices for a particular application solution. Some of the device specific application resources may provide similar functionality but differ only in the particular form of implementation, which may be specific to particular devices that may participate in an application solution. The network node stores each of the ASDs as well as configuration parameters for each application solution, i.e., particular configuration options for the application. Configuration options may include such aspects as power settings, menu options, application options, etc. The network node further stores at least one device profile for each computing entity that may participate in an application solution. The device profile stores information relating the hardware of the particular computing entity such as the type of processor, hardware interfaces as well as information relating to the software architecture for the particular computing entity such as the type of operating system associated with the particular computing entity.

The configuration module receives a request from a computing entity participating in an application solution to perform a configuration process. As a function of the computing entity requesting synchronization, the configuration module determines an associated application solution and configuration parameters associated with the application solution. Further, the configuration module determines a device profile associated with the computing entity requesting synchronization. As a function of the device profile and configuration options, the configuration module causes appropriate resource files to be deployed to the computing entity.

According to one embodiment the present invention is applied to a mobile computing environment including a back-end server, a middleware server and any number of mobile devices. Each mobile application solution includes collaborative behavior between a mobile device, the middleware server and the backend server. Accordingly, for a particular mobile application solution, a mobile device, middleware server and backend server are associated with respective resources that need to be configured and/or installed in order for the application to run.

DETAILED DESCRIPTION

Figure 1B:
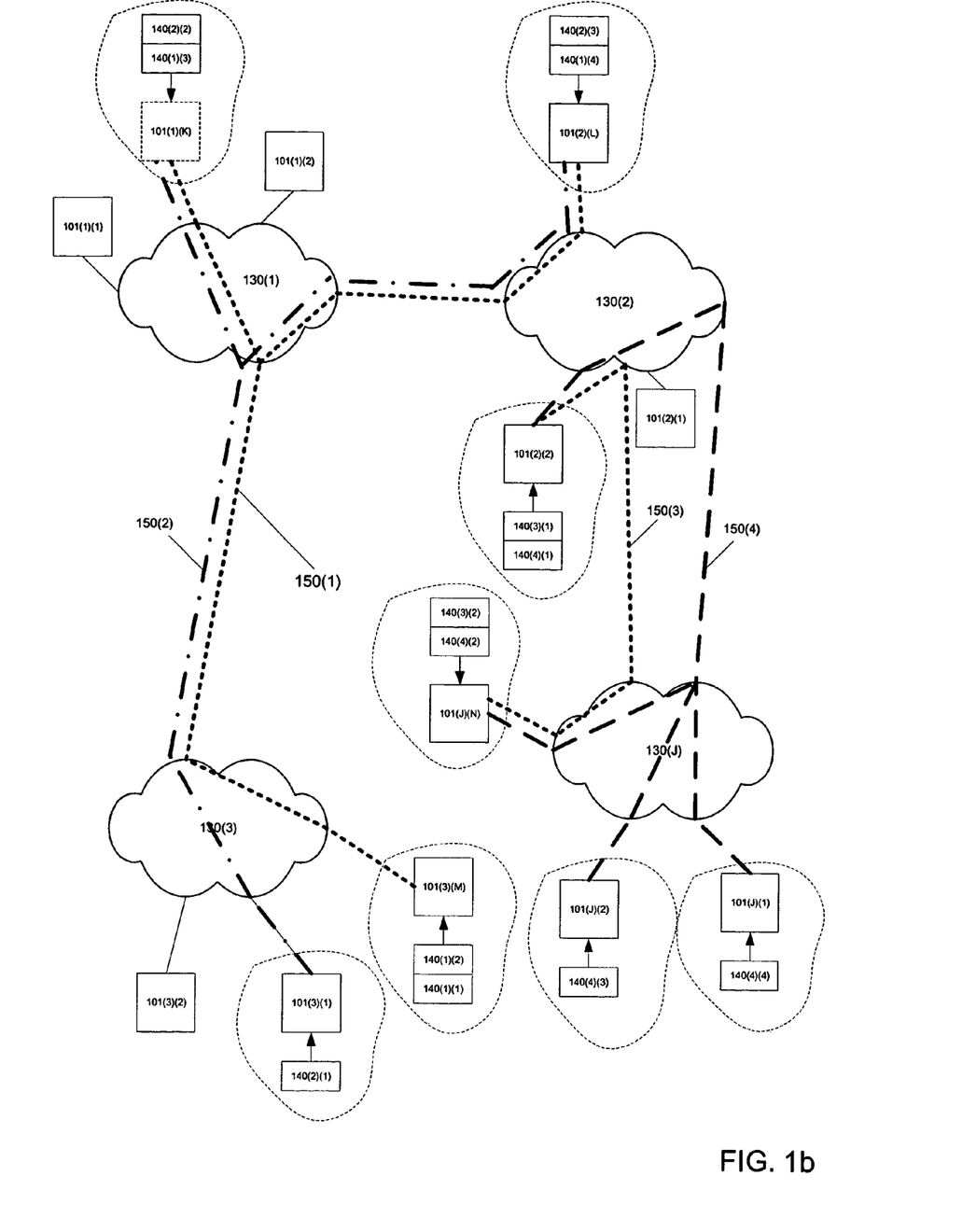
FIG. 1b depicts an abstract representation of a computing environment with respect to a number of exemplary application solutions according to one embodiment of the present invention.

FIG. 1b depicts an abstract representation of a computing environment with respect to a number of exemplary application solutions according to one embodiment of the present invention. Each of computing entities 101(1)(1)-101(J)(N) provides a locus for computational activity or processing tasks having and has an associated set of hardware dependent capabilities. Computing devices 101(1)(1)-101(J)(N) may be servers, desktop computers, laptop computers, personal desktop assistants, etc. Each computing device includes one or more processors and may be associated with one or more storage devices (not shown) such as a hard drive, CD ROM drive, etc. Computing devices 101(1)(1)-101(J)(N) collectively represent a heterogeneous set of computing resources.

As shown in FIG. 1b, computing devices 101(1)-101(N) may be situated in any arbitrarily complex network topology. Thus, computing devices 101(1)-101(N) may be co-located, disparately located or any combination of the two and may be situated on any number of disparate networks 130(1)-130(J) utilizing any number of network protocols (not shown). For example, as shown in FIG. 1b, computing devices 101(1)(1)-101(1)(K) are situated on network 130(1), computing devices 101(2)(1)-102(2)(L) are situated on network 130(2), computing devices 101(3)(1)-101(3)(M) are situated on network 130(3) and computing devices 101(J)(1)-101(J)(N) are situated on network 130(J).

FIG. 1b also shows a number of exemplary application solutions 150(1)-150(4). Each application solution 150(1)-150(4) includes a subset of computing devices 101(1)(1)-101(J)(N) performing a defined collaborative behavior. Thus, for example, application solution 150(1) includes the collective behavior of computing devices 101(3)(M), 101(1)(K) and 101(2)(L). Application solution 150(2) includes the collective behavior of computing devices 101(3)(1), 101(K) and 101(2)(L). Application solution 150(3) includes the collective behavior of computing devices 101(J)(N) and 101(2)(2). Application solution 150(4) includes the collective behavior of computing devices 101(2)(2), 101(J)(N), 101(J)(2) and 101(J)(1).

Note that the same computing device 101 may participate in multiple application solutions 150. For example, computing device 101(1)(K) participates in application solutions 150(1) and 150(2).

In order to define the particular behavior of a computing device 150 with respect to a particular application solution 150, at least one application solution resource is installed on that device. For example, with respect to application solution 150(1), application solution resource 140(2)(1) is installed on computing device 101(3)(1). On the other hand, since computing device 101(2)(L) participates in both application solutions 150(1) and 150(2), application solution resource 140(1)(4), which is associated with application solution 150(1) and application solution resource 140(2)(3), which is associated with application solution 150(2) are both installed on computing device 101(2)(L).

Effectively, a particular application solution 150 defines a distributed application, wherein intermediate computation data, instructions, etc. may be transmitted between and among participating computing devices 101. It is understood, that communication between computing devices 101 may be achieved using any type of network protocols and/or network protocol negotiation if particular computing devices reside on different types of networks.

Figure 2:
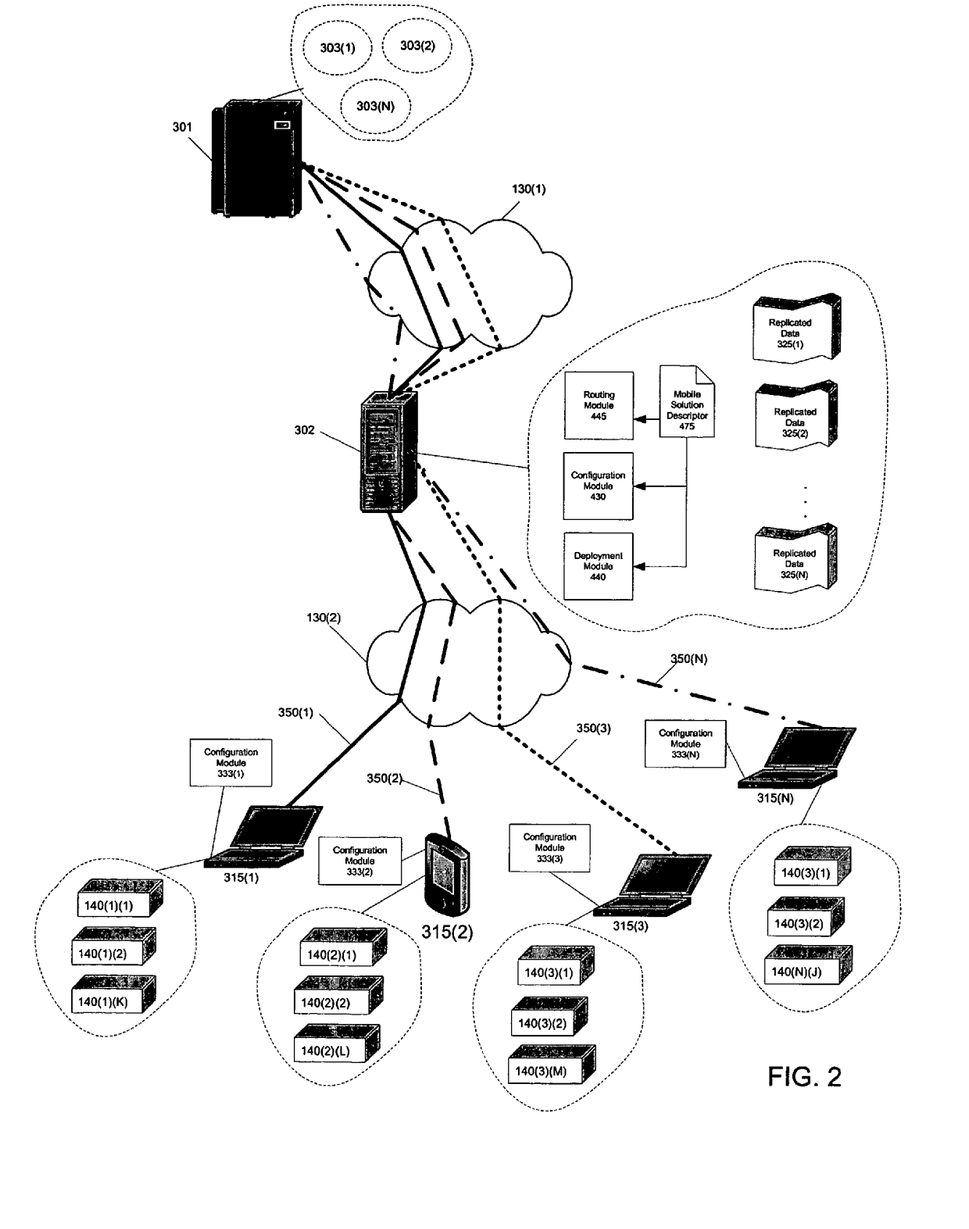
FIG. 2 depicts an embodiment of the present invention as applied to a mobile environment according to one embodiment of the present invention.

FIG. 2 depicts an embodiment of the present invention as applied to a mobile environment according to one embodiment of the present invention. Processing tasks comprising a mobile application solution are performed on computing entities backend server 301, middleware server 302 and mobile devices 315(1)-315(N). Mobile devices 215(1)-215(N) may include laptop devices, PDAs or any type of device that may be desirable for use within a mobile environment.

FIG. 2 also shows an arbitrary number of mobile application solutions 350(1)-350(N). Each application solution 350(1)-350(N) represents the collective behavior of backend server 301, middleware server 302 and one respective mobile device 315(1)-315(N). Thus, for example, the collective behavior of mobile device 315(2) (in this case a PDA), middleware server 302 and backend server 301 comprises mobile application solution 350(2). Similarly, the collective behavior of backend server 301, middleware server 302 and mobile device 315(3) (in this case a laptop computer) comprises mobile application solution 350(3).

In general, mobile devices 315(1)-315(N) have limited processing and memory capabilities and thus require the services of backend server 301 and/or middleware server 302 to carry out a mobile application solution. Each mobile device 315(1)-315(N) may include a local database (not shown). Thus, as shown in FIG. 2, each mobile application solution 350(1)-350(N) includes the computing entities of a particular mobile device (e.g., 315(2)) as well as backend server 301 and middleware server 302. Backend server operates as an application server and thus provides services of processes 301(1)-301(N) for data processing. Data obtained at mobile devices 315(1)-315(N) may be transferred to backend server 301 via middleware server 302 for processing and subsequently may be returned to mobile devices 315(1)-315(N) post-processing. Thus, as shown in FIG. 2, backend server 301 executes a plurality of processes 303(1)-303(N). Each of these particular processes may participate in a particular mobile application solution 350(1)-350(N) or not depending upon the particular application.

Middleware server 302 provides functions of routing via routing module 445 processing requests received from particular mobile devices 315(1)-315(N) to backend server for processing via particular processes 303(1)-303(N). In addition, middleware server performs routing of processed data from backend server 301 to particular mobile devices 315(1)-315(N) with respect to a particular mobile application solution (i.e., 350(1)-350(N)). In addition, middleware server 302 performs replication of data for a particular mobile application solution (350(1)-350(N)), which is received from backend server 301. Thus, as shown in FIG. 2, middleware server 302 receives and stores respective replicated data 325(1)-325(N) from backend server. This data is then employed as part of a particular mobile application solution 350(1)-350(N).

In addition, middleware server 302 performs a number of administrative tasks including configuration and deployment via configuration module 430, deployment module 440 and mobile solution descriptor 475. Mobile solution descriptor 475 stores a complete representation of all mobile application solutions 350(1)-350(N) existing on the network.

Mobile devices 315(1)-315(N) may operate in either an online or offline mode. However mobile devices 315(1)-315(N) provide a transparent experience to the user as if the devices were online at all times. This is achieved by providing resources 140(1)(1)-140(1)(K), 140(2)(1)-140(2)(L), 140(3)(1)-140(3)(M) and 140(N)(1)-140(N)(J) to respective mobile devices 315(1)-315(N). These resources provide processing and user interface behavior on the mobile device to so that the user experience is as if the respective application solution 350(1)-350(N) were operating locally on the respective mobile device. If a particular mobile device (315(1)-315(N)) is operating in an offline mode, that mobile device caches data locally on a local database (not shown), which can later be synchronized with backend server 302.

Each mobile device 315(1)-315(N) is further equipped with a respective configuration module 333(1)-333(N), which functions in conjunction with configuration module 430 on middleware sever 302 during a configuration process (described below). The purpose and function of respective configuration modules 333(1)-333(N) on mobile devices 315(1)-315(N) will become evident as the invention is further described.

Middleware server 302 includes routing module 445, configuration module 430, deployment module 440 and mobile solution descriptor 475. Configuration module 430 functions in conjunction with respective configuration modules 333(1)-333(N) on mobile devices 315(1)-315(N) to perform configuration processes with respective devices. Mobile solution descriptor 475 maintains a representation of all mobile application solutions (i.e., 350(1)-350(N)) existing within the network. In particular, as described below, mobile solution descriptor 475 maintains a representation of all resources, configuration settings relating to each mobile application solution 350(1)-350(N). In particular, with respect to the present invention, mobile solution descriptor 475 maintains a representation of configuration settings such as menu options, power settings, required resources, etc. for each of respective mobile devices 315(1)-315(N) participating in a particular mobile application solution 350(1)-350(N). Thus, for example, mobile solution descriptor 475 may maintain a representation of a registry for each mobile device 315(1)-315(N)—in particular, the resources that are current installed on the mobile device with respect to the associated mobile application solution.

Middleware server 302 also includes configuration module 430 and deployment module 440. Configuration module 430 performs configuration processes as a function of mobile solution descriptor 475 in conjunction with configuration modules 333(1)-333(N) on respective mobile devices 315(1)-315(N). In particular, as described below, mobile solution descriptor 475 maintains a representation of all resources necessary for a particular mobile application solution and thus the resources that must be installed on a particular mobile device. Similarly, deployment module 440 performs deployment processes to transfer resources and data to particular mobile devices 315(1)-315(N).

Figure 3:
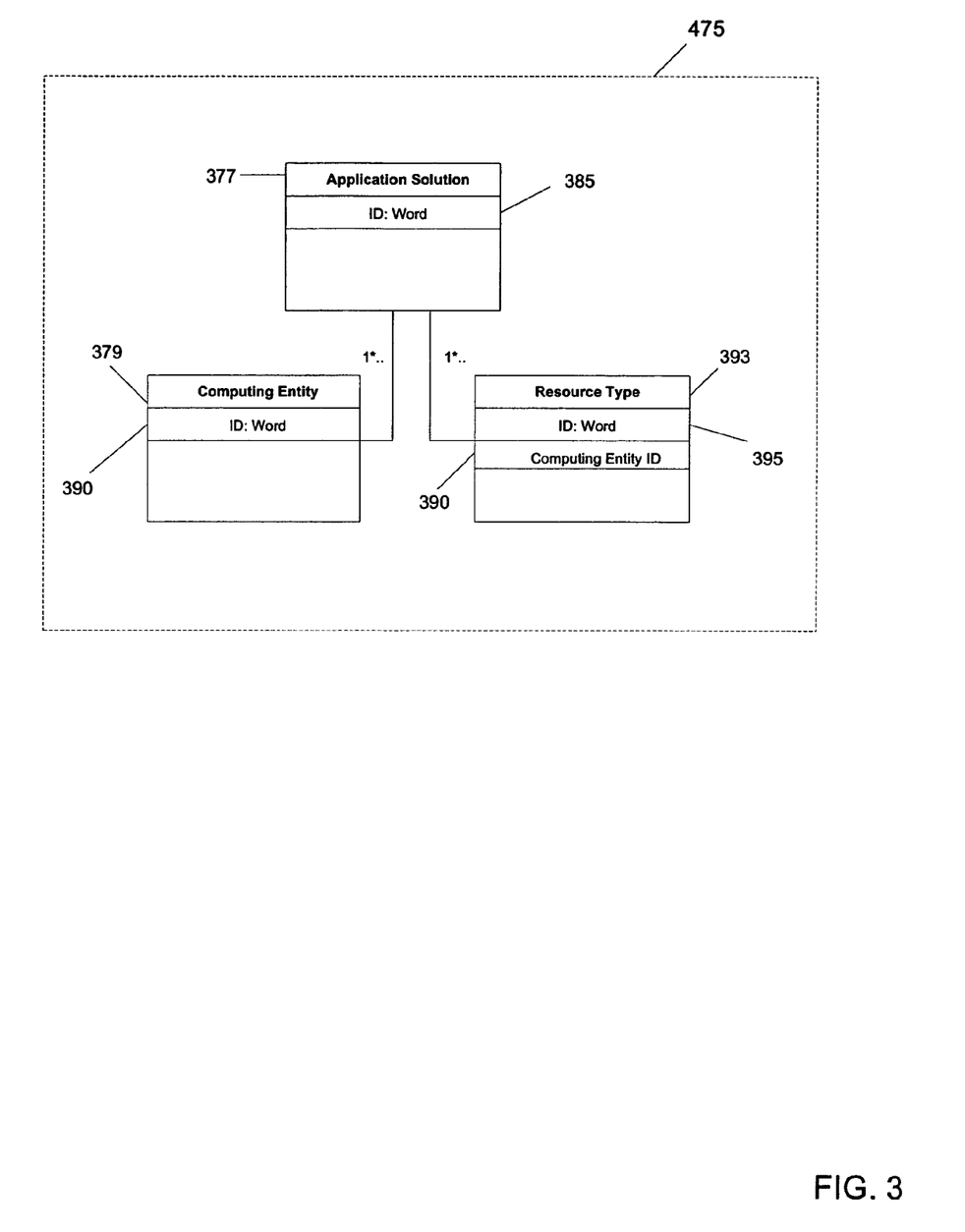
FIG. 3 shows a class diagram for an application solution descriptor according to one embodiment of the present invention.

FIG. 3 shows a class diagram for an application solution descriptor according to one embodiment of the present invention. The class architecture shown in FIG. 3 may be applied to a general computing environment as shown in FIG. 1b or the particular mobile environment (to represent a mobile application solution) as shown in FIG. 2. Referring to FIG. 3, application solution descriptor 475 includes application solution class 377, computing entity class 379 and resource class 393. Application solution class 377 is associated with a unique identifier 385 for identifying a particular application solution. Application solution class 377 is associated with at least one computing entity via computing entity 379 and at least one resource class 393. Each instance of computing entity class 379 includes a unique identifier 390 as does each instance of resource class 395. Each instance of a resource class 393 is associated with a particular computing entity ID 390, which indicates a particular computing entity (e.g., 315(1)-315(N)) upon which the resource should be installed.

Figure 4:
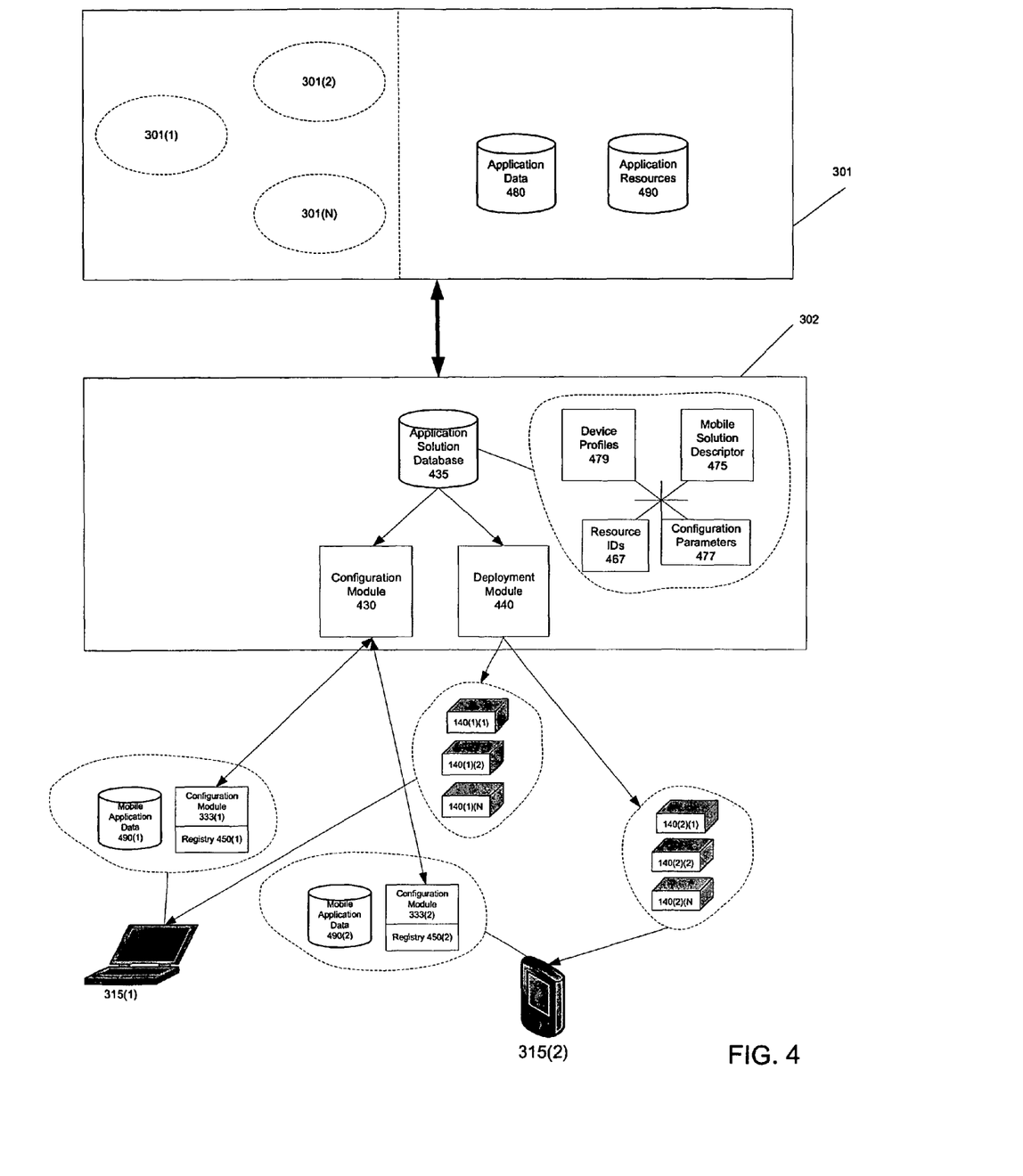
FIG. 4 depicts a configuration and deployment process according to one embodiment of the present invention.

FIG. 4 depicts a configuration and deployment process according to one embodiment of the present invention. FIG. 4 depicts a deployment process with respect to only two mobile devices 315(1) and 315(2). However, it is to be understood that the process may be applied to any arbitrary number of mobile devices. Referring to FIG. 4, backend server 301 stores application data 480 and application resources 490. Application data 480 and application resources are ultimately deployed to mobile devices 315(1) and 315(2) via middleware server 302. The configuration and deployment process is accomplished via configuration module 430 and deployment module 440 on middleware server and respective configuration modules 333(1) and 333(2) on respective mobile devices 315(1) and 315(2).

Figure 5:
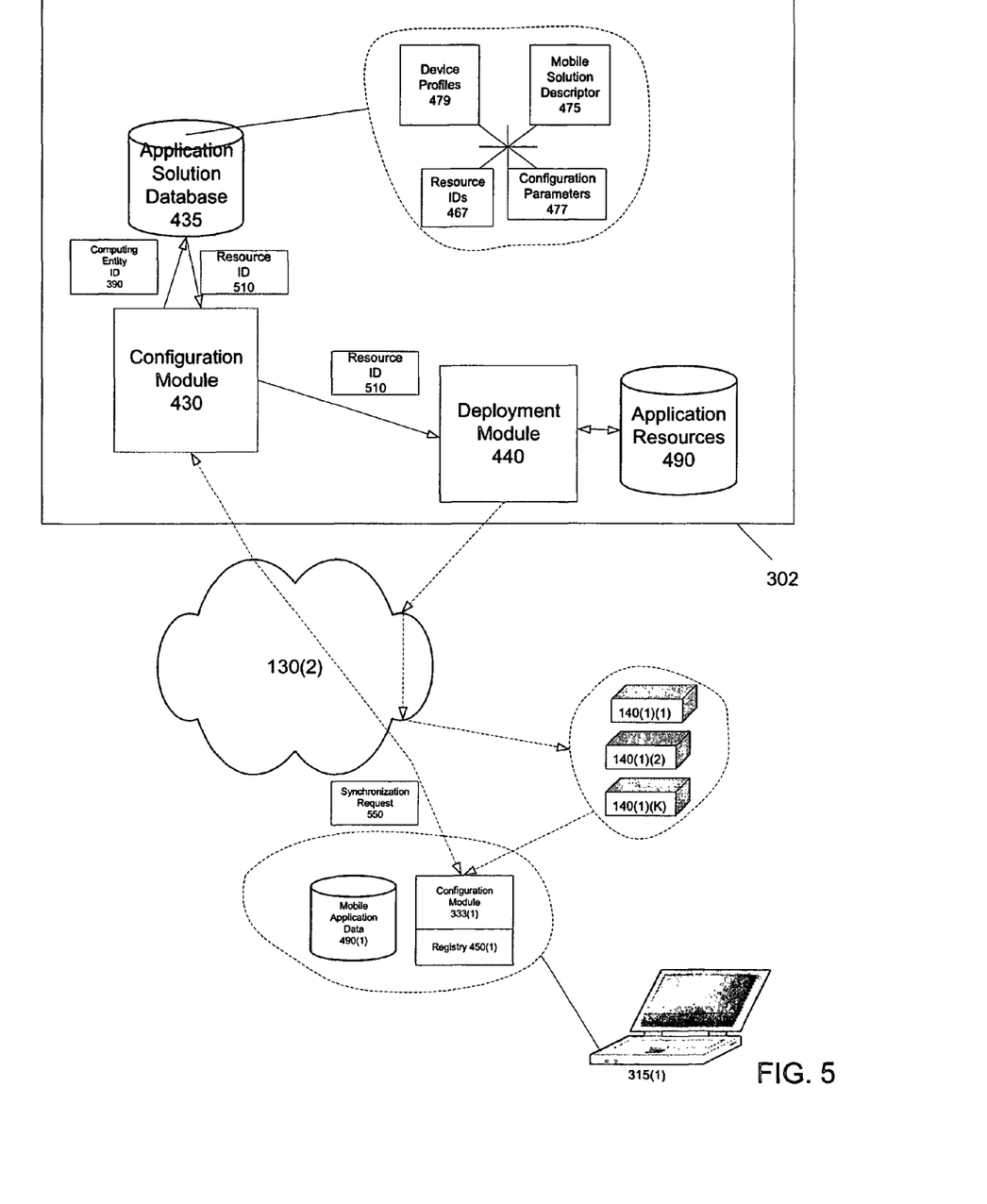
FIG. 5 illustrates the operation of a configuration and deployment module according to one embodiment of the present invention.

FIG. 5 illustrates the operation of a configuration and deployment module according to one embodiment of the present invention. FIG. 5 depicts configuration and deployment with respect to a single computing entity (315(1)). However, it is to be understood that the invention may be applied to any number of computing entities as shown in the preceding figures. Configuration module 430 on middleware server 302 communicates with communication module 333(1) on computing entity 333(1). During a synchronization process, computing entity 315(1) sends synchronization request to configuration module 430 on middleware server 302. Synchronization request 550 includes various information including the ID of computing entity 315(1). Upon receipt of synchronization request 550, configuration module attempts to determine appropriate resources to be deployed to computing device 315(1). In order to determine the appropriate resources, configuration module queries application solution database 435 using computing entity ID 390. Application solution database 435 returns resource ID 510 as a function of received computing entity ID 390.

In order to generate a particular resource ID as a function of computing entity ID 390, application solution database 435 matches computing entity ID 390 to a particular mobile application solution 350 using the class structure shown in FIG. 3. In particular, this is achieved using mobile solution descriptor 475. Mobile solution descriptor maps a particular computing entity ID 390 to a particular resource type ID 395. In addition, configuration parameters for the mobile application solution 350 are retrieved from configuration parameters table 477. Finally, the device profile associated with computing entity ID 390 is determined. A particular resource ID 510 is then generated as a function of the retrieved device profile, application solution and associated configuration parameters for that device and returned to configuration module.

Configuration module 510 then forwards the particular resource ID 510 to deployment module 440. Deployment module utilizes the received resource ID 510 to retrieve the appropriate application resource for the particular computing entity 315(1) from application resources database 490. The resource (e.g., 140(1)(1) . . . 140(1)(K)) are then forwarded to computing entity via configuration module 333(1). Configuration module 333(1) on computing entity 315(1) receives the resources and installs them on computing entity 315(1).

Computing entity 315(1) also includes registry 450(1). During the configuration process as outlined above, the registry information may be transmitted to configuration module 430 from configuration module 333(1) to determine whether particular resources (e.g., 140(1)(1)-140(1)(K)) need to be updated.

What is claimed is:

1. A method for remotely configuring at least one mobile device comprising:
   storing at a middleware server at least one configuration parameter relating to a software application, wherein each of the configuration parameters specifies configuration information as a function of the application;
   storing, at the middleware server, in a descriptor file a registry for each of the at least one mobile device, each registry maintaining application resources and configuration parameters relating to each software application that are currently installed on the each of the at least one mobile device;
   receiving at the middleware server a synchronization request from a mobile device participating in a particular application, the synchronization request to include a device identification (ID);
   determining an associated configuration parameter for the mobile device as a function of the particular application;
   determining an associated device profile for the mobile device as a function of the device ID;
   querying, in the descriptor file, the registry associated with the mobile device to determine whether to configure the mobile device using the determined associated configuration parameter;
   retrieving, from an application resources database, an application resource to be deployed to the mobile device using a generated resource identifier (ID), comprising:
      traversing a hierarchical class architecture corresponding to the particular application to identify a computing entity class having a device ID field value that matches the device ID received in the synchronization request;
      mapping the device ID field value of the computing entity class to a resource type class having a device ID field value that matches the computing entity class device ID field value;
      returning a resource type ID stored in a resource type ID field of the resource type class; and
      generating the resource ID from the returned resource type ID, the associated device profile and the associated configuration parameter; and
   initiating a process to configure the mobile device using the retrieved application resource.

2. The method according to claim 1, wherein initiating a process to configure the mobile device as a function of the associated configuration parameter includes transmitting device specific configuration files to the mobile device as a function of the associated configuration parameter.

3. The method according to claim 1, wherein the associated device profile relates to at least one of a hardware profile and a software profile.

4. The method according to claim 2, wherein initiating a process to configure the mobile device further includes
   receiving a device registry file from the mobile device;
   determining device specific files appropriate for the mobile device as a function of the associated configuration parameter and the device registry associated with the mobile device.

5. The method according to claim 1, wherein each of the configuration parameters associates the application with at least one configuration option.

6. The method according to claim 5, wherein the at least one configuration option includes at least one of power settings, menu options and application settings.

7. The method according to claim 1, wherein the at least one mobile device includes at least one of a laptop computer and a PDA ("Personal Digital Assistant").

8. A system for remotely configuring at least one mobile device comprising:
   a middleware server, wherein the middleware server stores device specific configuration files and configuration parameters, the configuration parameters associating a network application with at least one configuration option;
   a descriptor file stored in the middleware server to store a registry for each of the at least one mobile device, each registry maintaining the device specific configuration files and configuration parameters relating to the network application that are currently installed on the each of the at least one mobile device; and
   a configuration module, wherein the configuration module:
      receives a configuration request from a particular mobile device;
      determines associated device specific configuration files appropriate for the particular mobile device;
      queries, in the descriptor file, the registry associated with the particular mobile device to determine whether the associated device specific configuration files are already installed on the mobile device; and
      generates a resource identifier (ID), comprising:
         traversing a hierarchical class architecture corresponding to the particular application to identify a computing entity class having a device ID field value that matches the device ID received in the synchronization request;
         mapping the device ID field value of the computing entity class to a resource type class having a device ID field value that matches the computing entity class device ID field value;
         returning a resource type ID stored in a resource type ID field of the resource type class; and
         generating the resource ID from the returned resource type ID, the associated device profile and the associated configuration parameter; and
   a deployment module, wherein the deployment module:
      retrieves, from an application resources database, the associated device specific configuration files using the generated resource ID, and
      initiates a deployment of the associated device specific configuration files for the particular mobile device.

9. The system according to claim 8, wherein the network application includes the collective behavior of a plurality of mobile devices and each mobile device is associated with a device profile including at least one of a hardware profile and a software profile.

10. The system according to claim 9, wherein determining associated device specific configuration files further includes
   determining a particular network application associated with the particular mobile device;
   determining configuration options for the particular mobile device participating in the network application using the configuration parameters;
   determining the device specific configuration files as a function of the device profile for the particular mobile device.

11. The system according to claim 8, wherein the at least one mobile device includes at least one of a laptop computer, a PDA ("Personal Digital Assistant") and a desktop computer.

12. The system according to claim 8, wherein the at least one configuration option includes at least one of power settings, menu options and application settings.

13. A non-transitory program storage device including instructions for remotely configuring at least one mobile device, the instructions comprising:
   storing at a middleware server at least one configuration parameter for each the at least one mobile device, wherein each of the configuration parameters specifies configuration information as a function of a device profile;
   storing, at the middleware server, in a descriptor file a registry for each of the at least one mobile device, each registry maintaining application resources and configuration parameters relating to each software application that are currently installed on the each of the at least one mobile device;
   receiving at the middleware server a synchronization request from a first mobile device participating in a particular application, the synchronization request to include device identification (ID);
   determining an associated configuration parameter for the first mobile device as a function of the associated application;
   determining an associated device profile for the mobile device as a function of the device ID;
   querying, in the descriptor file, the registry associated with the first mobile device to determine whether to configure the first mobile device using the determined associated configuration parameter;
   retrieving, from an application resources database, an application resource to be deployed to the mobile device using a generated resource identifier (ID), comprising:
      traversing a hierarchical class architecture corresponding to the particular application to identify a computing entity class having a device ID field value that matches the device ID received in the synchronization request;
      mapping the device ID field value of the computing entity class to a resource type class having a device ID field value that matches the computing entity class device ID field value;
      returning a resource type ID stored in a resource type ID field of the resource type class; and
      generating the resource ID from the returned resource type ID, the associated device profile and the associated configuration parameter; and
   initiating a process to configure the first mobile device using the retrieved application resource.

14. The non-transitory program storage device according to claim 13, wherein initiating a process to configure the first mobile device as a function of the associated configuration parameter includes transmitting device specific configuration files to the first mobile device as a function of the associated configuration parameter.

15. The non-transitory program storage device according to claim 13, wherein the associated device profile relates to at least one of a hardware profile and a software profile.

16. The non-transitory program storage device according to claim 14, wherein initiating a process to configure the first mobile device further includes
   receiving a device registry file from the first mobile device;
   determining device specific files appropriate for the first device as a function of the associated configuration parameter and the device registry associated with the first mobile device.

17. The method according to claim 13, wherein each of the configuration parameters associates a network application with at least one configuration option.

18. The method according to claim 17, wherein the at least one configuration option includes at least one of power settings, menu options and application settings.

19. The method according to claim 13, wherein the mobile devices include at least one of a laptop computer and a PDA ("Personal Digital Assistant").

20. A method for deploying application resources to a mobile device comprising:
   storing, at a middleware server, in a descriptor file a registry for each of at least one mobile device, each registry maintaining application resources and configuration parameters relating to each software application that are currently installed on each of the at least one mobile device;
   receiving at the middleware server a synchronization request from a mobile device running an application, the synchronization request including a device identification (ID);
   determining a device profile as a function of the device ID;
   retrieving a configuration parameter associated with the application;
   generating a resource ID, comprising:
      traversing a hierarchical class architecture corresponding to the particular application to identify a computing entity class having a device ID field value that matches the device ID received in the synchronization request;
      mapping the device ID field value of the computing entity class to a resource type class having a device ID field value that matches the computing entity class device ID field value;
      returning a resource type ID stored in a resource type ID field of the resource type class; and
      generating the resource ID from the returned resource type ID, the device profile and the configuration parameter;
   querying, in the descriptor file, the registry associated with the mobile device to determine whether application resources corresponding to the generated resource ID are already installed on the mobile device;
   using the resource ID to retrieve the application resources from an application resource database; and
   initiating a process to install the application resources on the mobile device.

* * * * *